US012100359B2

(12) United States Patent
Kwag et al.

(10) Patent No.: US 12,100,359 B2
(45) Date of Patent: Sep. 24, 2024

(54) DISPLAY DEVICE AND METHOD OF DRIVING DISPLAY DEVICE

(71) Applicant: Samsung Display Co., LTD., Yongin-si (KR)

(72) Inventors: Dong Joon Kwag, Yongin-si (KR); Young Soo Hwang, Suwon-si (KR); Hyung Jin Kim, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 27 days.

(21) Appl. No.: 17/881,134

(22) Filed: Aug. 4, 2022

(65) Prior Publication Data

US 2023/0131968 A1 Apr. 27, 2023

(30) Foreign Application Priority Data

Oct. 21, 2021 (KR) ........................ 10-2021-0140669

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2310/0278* (2013.01); *G09G 2310/08* (2013.01); *G09G 2320/0271* (2013.01)

(58) Field of Classification Search
CPC .. G09G 3/3291; G09G 3/3266; G09G 3/3674; G09G 3/3685; G09G 2310/0278; G09G 2310/08; G09G 2310/0267; G09G 2310/0275; G09G 2320/0271; G09G 2320/0257; G09G 2320/046; G09G 2320/041; G09G 2360/16
See application file for complete search history.

(56) References Cited

U.S. PATENT DOCUMENTS

2015/0062197 A1* 3/2015 Jung .................... G09G 3/2003 345/690
2016/0217731 A1* 7/2016 Joo ...................... G09G 3/3208
2020/0074708 A1* 3/2020 Park ........................ G06T 11/60

FOREIGN PATENT DOCUMENTS

KR 10-1720345 3/2017
KR 10-2017-0136086 12/2017
KR 10-2020-0039082 4/2020
KR 10-2021-0031026 3/2021

* cited by examiner

*Primary Examiner* — David Tung
(74) *Attorney, Agent, or Firm* — KILE PARK REED & HOUTTEMAN PLLC

(57) ABSTRACT

A display device includes a display panel including sub-pixels arranged in an image display region of the display panel to display an image, a data driver that applies a data voltage to data lines, a scan signal driver that applies scan signals to scan signal lines, a data compensator that analyzes image data received from an outside to divide at least one deterioration region and deterioration peripheral regions, and compares and analyzes image data of the at least one deterioration region and the deterioration peripheral regions to compensate or modulate the image data of the at least one deterioration region, and a timing controller that controls the data driver and the scan signal driver to display compensation data including the compensated or modulated image data as an image.

18 Claims, 17 Drawing Sheets

FIG. 9

AVERAGE GRADATION FOR DETERIORATION REGION

MAINTAINED FRAME

| MAINTAINED FRAME \ AVERAGE GRADATION FOR DETERIORATION REGION | 0 | 1 | 2 | 3 | 4 | ··· | 249 | 250 | 251 | 252 | 253 | 254 | 255 |
|---|---|---|---|---|---|---|---|---|---|---|---|---|---|
| 100 | 1 | 1 | 1 | 1 | 1 | | 1 | 1 | 1 | 1 | 1 | 1 | 1 |
| 101 | 1.01 | 1.01 | 1.01 | 1.02 | 1.02 | ··· | 1.05 | 1.06 | 1.06 | 1.06 | 1.07 | 1.07 | 1.07 |
| 102 | 1.01 | 1.01 | 1.02 | 1.02 | 1.03 | ··· | 1.05 | 1.06 | 1.06 | 1.07 | 1.07 | 1.07 | 1.07 |
| 103 | 1.01 | 1.02 | 1.02 | 1.03 | 1.03 | ··· | 1.05 | 1.06 | 1.07 | 1.07 | 1.08 | 1.08 | 1.08 |
| 104 | 1.02 | 1.02 | 1.03 | 1.04 | 1.04 | ··· | 1.05 | 1.06 | 1.07 | 1.07 | 1.08 | 1.08 | 1.08 |
| 105 | 1.02 | 1.03 | 1.03 | 1.04 | 1.04 | ··· | 1.06 | 1.07 | 1.07 | 1.08 | 1.08 | 1.08 | 1.09 |
| ⋮ | ⋮ | ⋮ | ⋮ | ⋮ | ⋮ | ⋱ | ⋮ | ⋮ | ⋮ | ⋮ | ⋮ | ⋮ | ⋮ |
| 994 | 1.06 | 1.04 | 1.05 | 1.05 | 1.05 | ··· | 1.07 | 1.08 | 1.09 | 1.10 | 1.10 | 1.10 | 1.10 |
| 995 | 1.06 | 1.04 | 1.06 | 1.06 | 1.07 | ··· | 1.07 | 1.09 | 1.10 | 1.12 | 1.11 | 1.12 | 1.11 |
| 996 | 1.06 | 1.06 | 1.06 | 1.07 | 1.08 | ··· | 1.08 | 1.12 | 1.12 | 1.13 | 1.13 | 1.13 | 1.13 |
| 997 | 1.06 | 1.06 | 1.07 | 1.07 | 1.08 | ··· | 1.08 | 1.12 | 1.13 | 1.13 | 1.13 | 1.13 | 1.13 |
| 998 | 1.06 | 1.07 | 1.08 | 1.08 | 1.09 | ··· | 1.09 | 1.13 | 1.13 | 1.14 | 1.14 | 1.14 | 1.14 |
| 999 | 1.07 | 1.07 | 1.09 | 1.08 | 1.10 | ··· | 1.10 | 1.13 | 1.13 | 1.13 | 1.14 | 1.15 | 1.15 |
| 1000 | 1.07 | 1.08 | 1.09 | 1.09 | 1.10 | ··· | 1.10 | 1.14 | 1.14 | 1.14 | 1.14 | 1.14 | 1.15 |

FIG. 12

AVERAGE GRADATION FOR DETERIORATION REGION (columns); AVERAGE GRADATION FOR PERIPHERAL REGION (rows)

| | 0 | 1 | 2 | 3 | 4 | 5 | · · · | 249 | 250 | 251 | 252 | 253 | 254 | 255 |
|---|---|---|---|---|---|---|---|---|---|---|---|---|---|---|
| 0 | 1.02 | 1.02 | 1.02 | 1.02 | 1.02 | 1.02 | | 1.03 | 1.03 | 1.03 | 1.03 | 1.03 | 1.03 | 1.03 |
| 1 | 1.02 | 1.03 | 1.03 | 1.04 | 1.05 | 1.05 | · · · | 1.06 | 1.06 | 1.07 | 1.07 | 1.07 | 1.07 | 1.07 |
| 2 | 1.03 | 1.04 | 1.04 | 1.04 | 1.05 | 1.05 | · · · | 1.06 | 1.06 | 1.07 | 1.07 | 1.08 | 1.08 | 1.08 |
| 3 | 1.03 | 1.04 | 1.04 | 1.05 | 1.05 | 1.05 | · · · | 1.06 | 1.07 | 1.07 | 1.08 | 1.08 | 1.09 | 1.09 |
| 4 | 1.04 | 1.05 | 1.05 | 1.05 | 1.06 | 1.06 | · · · | 1.07 | 1.08 | 1.08 | 1.09 | 1.09 | 1.10 | 1.10 |
| 5 | 1.05 | 1.05 | 1.05 | 1.06 | 1.06 | 1.07 | · · · | 1.07 | 1.08 | 1.09 | 1.09 | 1.10 | 1.10 | 1.11 |
| ⋮ | ⋮ | ⋮ | ⋮ | ⋮ | ⋮ | ⋮ | ⋱ | ⋮ | ⋮ | ⋮ | ⋮ | ⋮ | ⋮ | ⋮ |
| 249 | 1.10 | 1.11 | 1.12 | 1.12 | 1.13 | 1.13 | · · · | 1.17 | 1.18 | 1.18 | 1.19 | 1.19 | 1.19 | 1.19 |
| 250 | 1.10 | 1.11 | 1.12 | 1.13 | 1.14 | 1.14 | · · · | 1.18 | 1.18 | 1.18 | 1.19 | 1.19 | 1.19 | 1.19 |
| 251 | 1.10 | 1.12 | 1.12 | 1.13 | 1.14 | 1.14 | · · · | 1.18 | 1.19 | 1.19 | 1.19 | 1.20 | 1.20 | 1.21 |
| 252 | 1.10 | 1.12 | 1.13 | 1.13 | 1.14 | 1.15 | · · · | 1.19 | 1.20 | 1.20 | 1.19 | 1.20 | 1.20 | 1.21 |
| 253 | 1.10 | 1.13 | 1.3 | 1.14 | 1.14 | 1.15 | · · · | 1.19 | 1.20 | 1.21 | 1.20 | 1.20 | 1.21 | 1.22 |
| 254 | 1.10 | 1.13 | 1.13 | 1.14 | 1.15 | 1.16 | · · · | 1.20 | 1.20 | 1.21 | 1.21 | 1.21 | 1.21 | 1.22 |
| 255 | 1.11 | 1.14 | 1.14 | 1.15 | 1.16 | 1.16 | · · · | 1.20 | 1.20 | 1.20 | 1.21 | 1.22 | 1.22 | 1.22 |

DISPLAY DEVICE AND METHOD OF DRIVING DISPLAY DEVICE

CROSS REFERENCE TO RELATED APPLICATION(S)

This application claims priority to and benefits of Korean Patent Application No. 10-2021-0140669 under 35 U.S.C. 119, filed on Oct. 21, 2021 in the Korean Intellectual Property Office (KIPO), the entire contents of which are herein incorporated by reference.

BACKGROUND

1. Technical Field

The disclosure relates to a display device and a method of driving the display device.

2. Description of the Related Art

As the information society develops, the demand for a display device for displaying an image is increasing in various forms. For example, a display device is applied to various electronic devices such as a smart phone, a digital camera, a notebook computer, a navigation system, and a smart television. Among various display devices, since an organic light emitting display device includes a light emitting element in which pixels of a display panel can emit light by itself, an image can be displayed without a backlight unit that provides light to the display panel.

The display device includes a display panel including data lines, scan signal lines, and multiple pixels electrically connected to the data lines and the scan signal lines, a scan signal driver which supplies scan signals to the scan signal lines, and a data driver which supplies data voltages to the data lines. The scan signal driver can be formed in a non-display region of the display panel.

However, in case that a display device (specifically, an organic light emitting display device) continuously displays an image, text, or the like having the same gradation, pixels which continuously display the same gradation can be deteriorated and thus can generate an afterimage.

SUMMARY

The disclosure is directed to providing a display device capable of compensating for deterioration for each image display region by analyzing image data, and a method of driving the display device.

Further, the disclosure is directed to providing a display device capable of compensating for deterioration of a deterioration generation region by analyzing and predicting a deterioration degree of the deterioration generation region and a peripheral region, and a method of driving the display device.

Technical problems of the disclosure are not limited to the above-mentioned technical problems, and other technical problems which are not mentioned can be clearly understood from the following descriptions by those skilled in the art.

According to an embodiment of the disclosure, a display device may include a display panel including sub-pixels arranged in an image display region of the display panel to display an image; a data driver that applies a data voltage to data lines; a scan signal driver that applies scan signals to scan signal lines; a data compensator that analyzes image data received from an outside to divide at least one deterioration region and deterioration peripheral regions, and compares and analyzes the image data of the at least one deterioration region and the deterioration peripheral regions to compensate or modulate the image data of the at least one deterioration region; and a timing controller that controls the data driver and the scan signal driver to display compensation data including the compensated or modulated image data as an image.

In an embodiment, the data compensator may include a deterioration analyzer that sequentially compares and analyzes the image data per at least one frame to set the at least one deterioration region and the deterioration peripheral regions; a data analyzer that calculates average gradation values of the at least one deterioration region and the deterioration peripheral regions; a compensation value detector that analyzes at least one of the average gradation values of the at least one deterioration region and the average gradation values of the deterioration peripheral regions to extract a first compensation gain value or a second compensation gain value; and a data corrector that compensates or modulates gradation values of the sub-pixels of the at least one deterioration region using the first compensation gain value or the second compensation gain value.

In an embodiment, the data compensator may further include a data aligner that divides and aligns the image data sequentially input from the outside or a system-on-chip of a system circuit board per the sub-pixels, per at least one scan line, and per at least one frame to store the image data in a memory; and a compensation output part that combines the image data and the compensated or modulated image data to generate the compensation data per at least one frame.

In an embodiment, the deterioration analyzer sequentially may compare and may analyze the image data of frames by sequentially comparing sub-pixel data of a sub-pixel included in the image data of adjacent ones of the frames, may designate the sub-pixel as a deteriorated pixel in case that the sub-pixel data of the sub-pixel included in the image data of the frames is identically maintained for a preset number of frames or more or maintained at a gradation in a preset similarity range, and may set a region where the deteriorated pixel is disposed as one of the at least one deterioration region.

In an embodiment, the deterioration analyzer may apply a preset size of a sub-pixel matrix based on position coordinates of the at least one deterioration region to set the deterioration peripheral regions, and may share setting information of the at least one deterioration region and setting information of the deterioration peripheral regions with the data analyzer.

In an embodiment, the data analyzer may sequentially compare gradation values of image data of the sub-pixels included in the deterioration region to divide the deterioration region into block regions, and may set the block regions as a same block in case that a difference in the gradation values between the sequentially compared sub-pixels adjacent to each other is within a preset range to divide the block regions for the deterioration region according to a region where sub-pixels having similar gradation values are disposed.

In an embodiment, the data analyzer may sequentially compare gradation values of image data of the sub-pixels included in the deterioration peripheral regions to divide the deterioration peripheral regions into block regions, and may calculate average gradation values of the divided block regions in the at least one deterioration region and the deterioration peripheral regions.

In an embodiment, the compensation value detector may calculate average gradation values of the block regions included in the at least one deterioration region, may detect a period or number of frames in which the average gradation values of the block regions are identically maintained or are maintained within a preset gradation range, and may extract a first compensation gain value according to the period or the number of frames in which the average gradation values of the block regions are identically maintained or maintained within the preset gradation range.

In an embodiment, the data compensator may multiply or add the gradation values of the sub-pixels for the block regions included in the at least one deterioration region and the first compensation gain value to compensate or modulate gradation data of the sub-pixels for the block regions included in the at least one deterioration region in case that the first compensation gain value is input into the data compensator.

In an embodiment, the compensation value detector may detect a period or number of frames in which average gradation values of the block regions included in the deterioration peripheral regions are identically maintained or are maintained within a preset gradation range, and may determine that deterioration occurred in a corresponding one of the deterioration peripheral regions in case that the period or the number of frames in which the average gradation values of the block regions included in the corresponding one of the deterioration peripheral regions are identically maintained or are maintained within a preset gradation range becomes greater than or equal to a preset period or a preset number of frames.

In an embodiment, the compensation value detector may compare the average gradation values of the block regions included in the at least one deterioration region and an average gradation value of any of the one block regions included in the deterioration peripheral regions to extract a second compensation gain value according to a comparison result in case that it is determined that the deterioration occurred in the corresponding one of the deterioration peripheral regions.

In an embodiment, the data compensator may add or multiply the gradation values of the sub-pixels for the block regions included in the at least one deterioration region and the second compensation gain value to compensate or modulate gradation data of the sub-pixels for the block regions included in the at least one deterioration region in case that the second compensation gain value is input into the data compensator.

According to an embodiment of the disclosure, a method of driving a display device may include aligning image data received from an outside per at least one frame; sequentially comparing and analyzing the image data per at least one frame and setting at least one deterioration region and deterioration peripheral regions; calculating average gradation values of the at least one deterioration region and the deterioration peripheral regions; analyzing the average gradation values of the at least one deterioration region and the deterioration peripheral regions and extracting a first compensation gain value or a second compensation gain value; and compensating or modulating gradation values of sub-pixels of the at least one deterioration region using the first compensation gain value or the second compensation gain value.

In an embodiment, the method of driving a display device may further include combining the image data and the compensated or modulated image data to generate compensation data per at least one frame; and controlling a data driver and a scan signal driver to display the compensation data as an image on a display panel.

In an embodiment, the setting of the at least one deterioration region and the deterioration peripheral regions may include sequentially comparing and analyzing the image data of frames by sequentially comparing sub-pixel data of a sub-pixel included in the image data of adjacent ones of the frames; designating the sub-pixel as a deteriorated pixel in case that the sub-pixel data of the sub-pixel included in the image data of the frames is identically maintained for a preset number of frames or more or maintained at a gradation in a preset similarity range; of setting a region where the deteriorated pixel is disposed as one of the at least one deterioration region; and applying a preset size of a sub-pixel matrix based on position coordinates of the at least one deterioration region to set the deterioration peripheral regions.

In an embodiment, the calculating of the average gradation values of the at least one deterioration region and the deterioration peripheral regions may include sequentially comparing the gradation values of image data for sub-pixels included in the deterioration region and dividing the deterioration region into block regions; and setting block regions as a same block in case that a difference in gradation values between the sequentially compared sub-pixels adjacent to each other is within a preset range to divide the block regions for the deterioration region according to a region where the sub-pixels having similar gradation values are disposed.

In an embodiment, the calculating of the average gradation values of the at least one deterioration region and the deterioration peripheral regions may further include sequentially comparing the gradation values of image data for sub-pixels included in each of the deterioration peripheral regions and dividing the deterioration peripheral regions into block regions; and calculating average gradation values of the divided block regions in the at least one deterioration region and the deterioration peripheral regions.

In an embodiment, the extracting of the first compensation gain value or the second compensation gain value may include calculating the average gradation values of the block regions included in the at least one deterioration region; detecting a period or number of frames in which the average gradation values of the block regions are identically maintained or are maintained within a preset gradation range; and extracting a first compensation gain value according to the period or the number of frames in which the average gradation values of the block regions are identically maintained or are maintained within the preset gradation range.

In an embodiment, the extracting of the first compensation gain value and the second compensation gain value may include: detecting a period or number of frames in which the average gradation values of the block regions included in the deterioration peripheral regions are identically maintained or are maintained within a preset gradation range; and determining that deterioration occurred in a corresponding one of the deterioration peripheral regions in case that the period or number of frames in which the average gradation values of the block regions included in the corresponding one of the deterioration peripheral regions are identically maintained or are maintained within a preset gradation range becomes greater than or equal to a preset period or a preset number of frames.

In an embodiment, the extracting of the first compensation gain value or the second compensation gain value may further include comparing the average gradation values of the block regions included in the deterioration region and an average gradation value of any one of the block regions included in the deterioration peripheral regions and extracting a second compensation gain value according to a comparison result in case that it is determined that the deterioration occurred in the corresponding one of the deterioration peripheral regions.

In a display device and a method of driving the display device according to embodiments, the generation of an afterimage may be suppressed by analyzing image data and compensating for stress and a deterioration degree of pixels for each image display region.

Further, in a display device and a method of driving the display device according to embodiments, image quality deterioration due to image distortion may be prevented and user satisfaction may be improved by compensating deterioration of a deterioration generation region according to a deterioration degree of the peripheral regions of the deterioration generation region.

Effects according to the embodiments are not limited by the above-described contents, and more various effects are included in the specification.

BRIEF DESCRIPTION OF THE DRAWINGS

The above and other aspects and features of the disclosure will become more apparent by describing in detail embodiments thereof with reference to the attached drawings, in which:

FIG. 9 is a schematic view for describing a method of extracting a first compensation gain value for a deterioration region of a compensation value detector shown in FIG. 5;

FIG. 12 is a schematic view for describing a method of extracting a second compensation gain value for the deterioration region of the compensation value detector shown in FIG. 5;

DETAILED DESCRIPTION OF THE EMBODIMENTS

The disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be more thorough and complete, and will convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

Each of the features of the various embodiments of the disclosure may be combined or combined with each other, in part or in whole, and technically various interlocking and driving are possible. Each embodiment may be implemented independently of each other or may be implemented together in an association.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, specific embodiments will be described with reference to the accompanying drawings.

Figure 1:
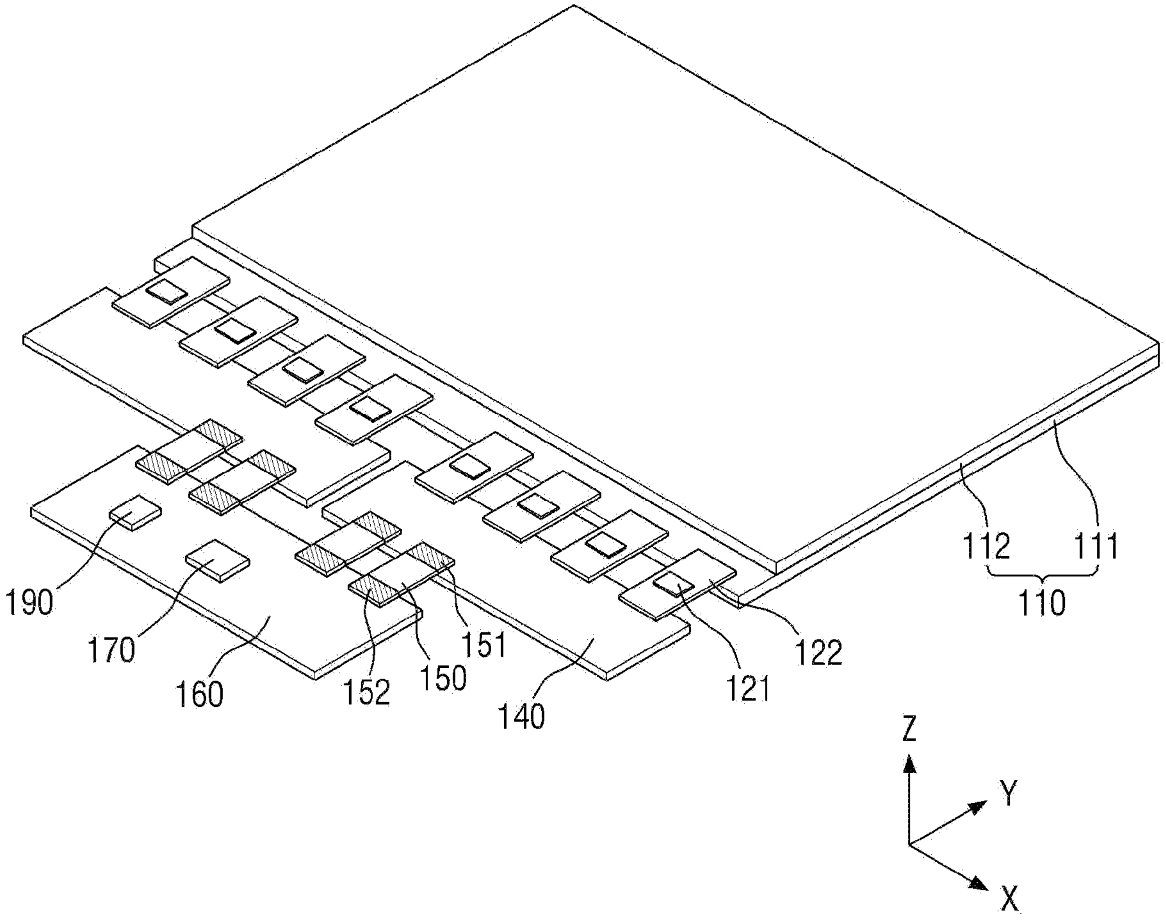
FIG. 1 is a perspective view illustrating a display device according to an embodiment.
Figure 2:
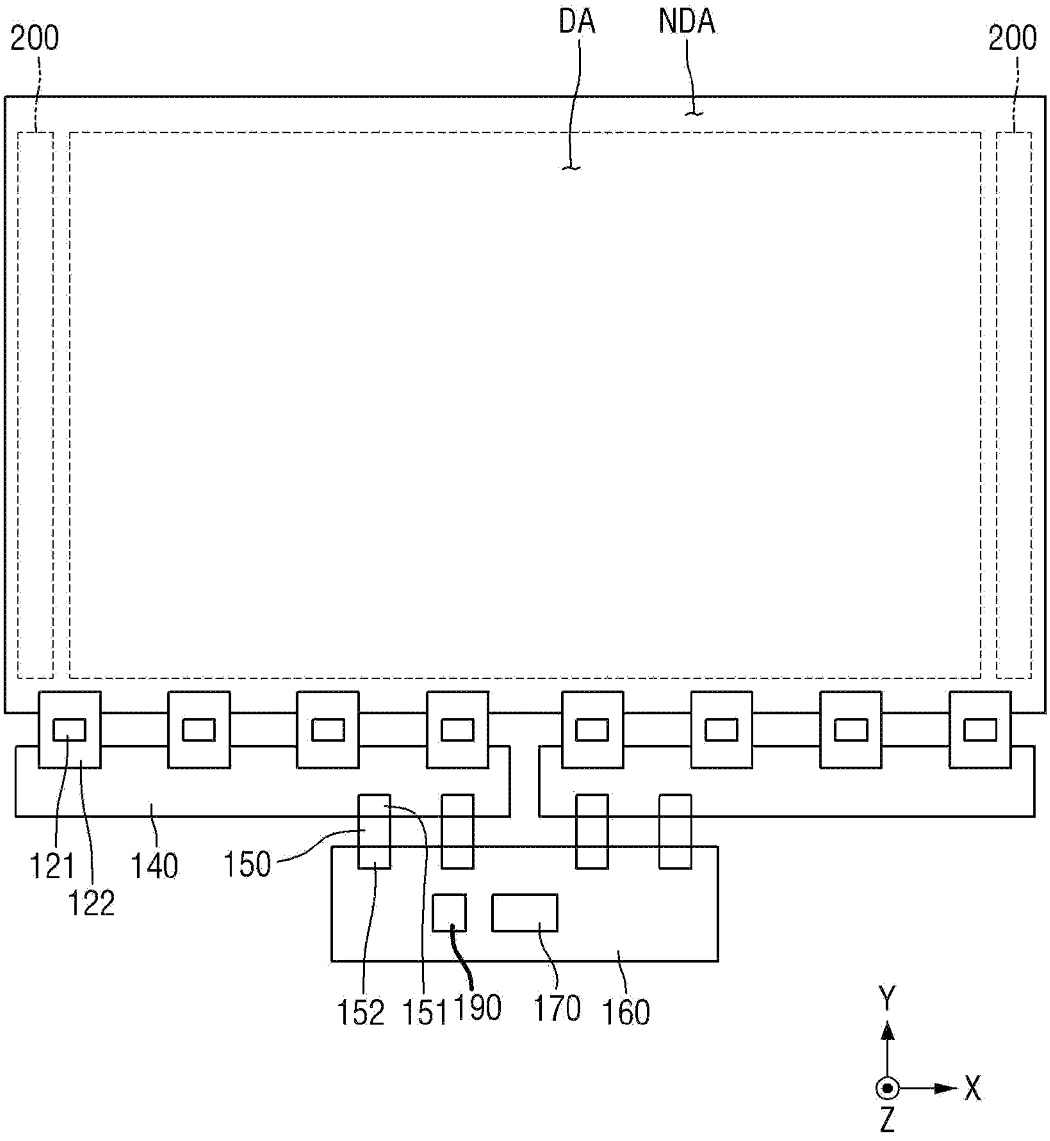
FIG. 2 is a plan view illustrating the display device according to an embodiment.
Figure 3:
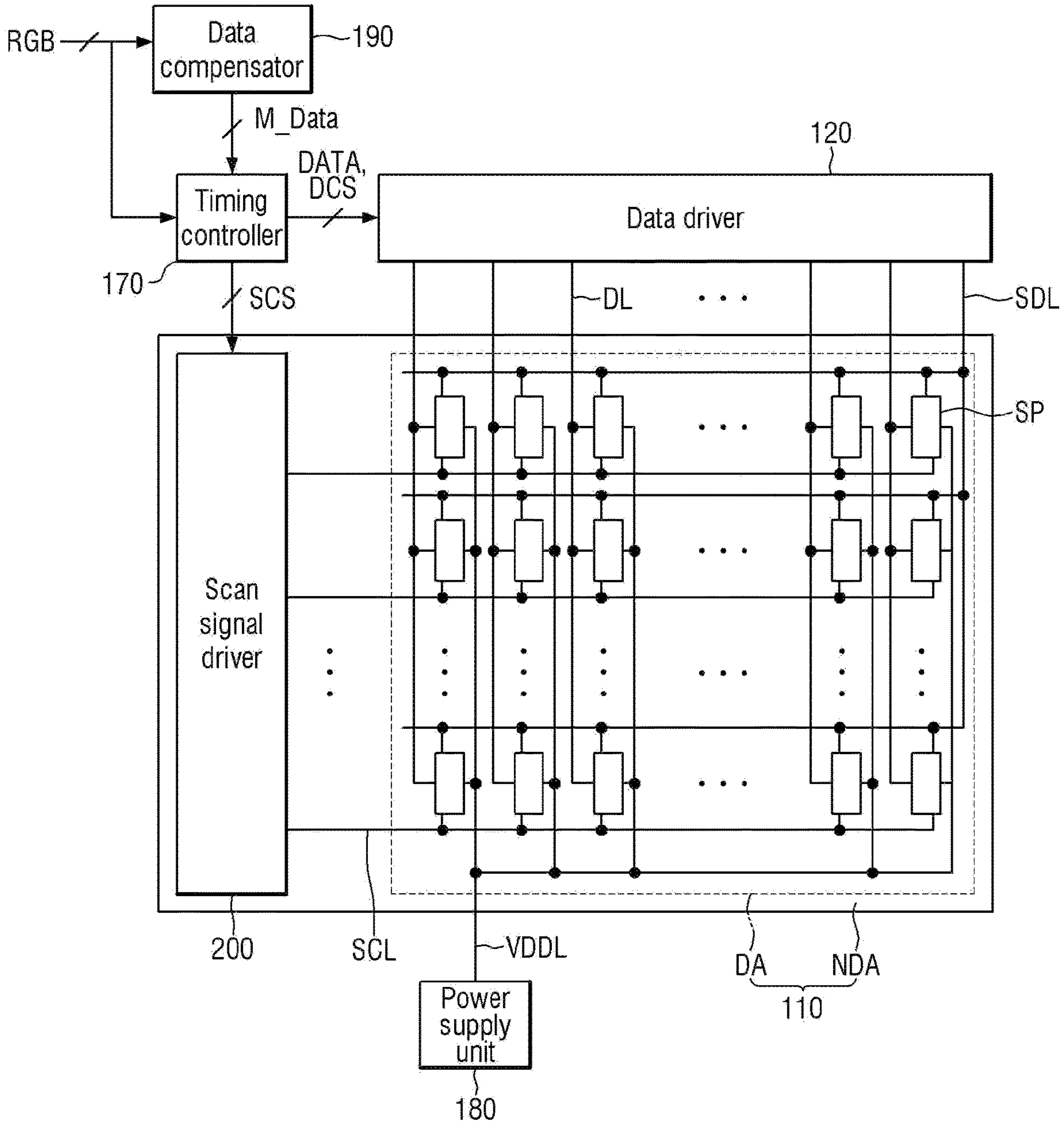
FIG. 3 is a schematic block diagram illustrating the display device according to an embodiment.

FIG. 1 is a perspective view illustrating a display device according to an embodiment. FIG. 2 is a plan view illustrating the display device according to an embodiment. FIG. 3 is a schematic block diagram illustrating the display device according to an embodiment.

In the specification, "upper portion", "top", and "upper surface" may indicate an upward direction with respect to a display panel 110, for example, a Z-axis direction, and "lower portion", "bottom", "and lower surface" may indicate a downward direction with respect to the display panel 110, for example, a direction opposite the Z-axis direction. "Left side", "right side", "upper side", and "lower side" may indicate directions in case that the display panel 110 is viewed in a plan view. For example, "left side" may indicate a direction opposite an X-axis direction, "right side" may indicate the X-axis direction, "upper side" may indicate a Y-axis direction, and "lower side" may indicate a direction opposite the Y-axis direction.

In the specification, the display device according to an embodiment may be a device that displays a video or still image, and may be used as a display screen of each of portable electronic devices such as a mobile phone, a smart phone, a tablet personal computer, a smart watch, a watch phone, a mobile communication terminal, an electronic notebook, an electronic book, a portable multimedia player (PMP), a navigation system, an ultra-mobile PC (UMPC), and the like. The display device according to an embodiment may be used as a display screen of each of various medium-large products such as a television, a notebook computer, a monitor, a billboard, an Internet of Things (IOT) device, and the like. Hereinafter, an example in which the display device according to an embodiment is a medium-large display device including multiple source drivers 121 may be described, but the disclosure is not limited thereto.

The display device according to an embodiment may be a small display device including one source driver 121, and flexible films 122, source circuit boards 140, and first cables 150 may be omitted. Further, in case that the display device according to an embodiment is a small display device, the source driver 121, a timing controller 170, and a data compensator 190 may be integrated into one integrated circuit and may be disposed on one control circuit board 160 or may be adhered to a first substrate 111 of the display panel 110. Examples of a medium-large display device may include a television, a monitor, and the like and examples of a small display device may include a smart phone, a tablet PC, and the like.

Referring to FIGS. 1, 2, and 3, the display device may include a display panel 110, a data driver 120 including a source drivers 121, flexible films 122, source circuit boards 140, first cables 150, a scan signal driver 200, a control circuit board 160, a timing controller 170, a data compensator 190, and a power supply unit 180.

The display panel 110 may be formed in a rectangular shape in a plan view. For example, the display panel 110 may have a rectangular planar shape having longer sides in a first direction (X-axis direction) and shorter sides in a second direction (Y-axis direction). A corner where the long side in the first direction (X-axis direction) and the short side in the second direction (Y-axis direction) meet may form an angle or may be rounded to have a curvature. The planar shape of the display panel 110 is not limited to the rectangular shape, and may be formed in another polygonal shape, a circular shape, or an oval shape. in FIGS. 1 and 2, Although the embodiment of the display panel 110 is described as flat in FIGS. 1 and 2, the disclosure is not limited thereto. The display panel 110 may include a curved surface portion bent with a curvature.

The display panel 110 may include a first substrate 111 and a second substrate 112. The second substrate 112 may be disposed to face a first surface of the first substrate 111. The first substrate 111 and the second substrate 112 may be formed to be rigid or flexible. The first substrate 111 may be formed of glass or plastic. The second substrate 112 may be formed of glass, plastic, an encapsulation film, or a barrier layer. In other embodiments, the second substrate 112 may be omitted.

The display panel 110 may be an organic light emitting display panel using an organic light emitting diode, a quantum dot light emitting display panel including a quantum dot light emitting layer, an inorganic light emitting display panel including an inorganic semiconductor, or a micro light emitting display panel using a micro light emitting diode (LED). Hereinafter, an example in which the display panel 110 is an organic light emitting display panel will be described, but the disclosure is not limited thereto.

The display panel 110 may include a display region DA where sub-pixels SP are formed to display an image, and a non-display region NDA which is a peripheral region of the display region DA. In the display region DA, in addition to the sub-pixels SP, scan signal lines SCL, sensing signal lines SSL (not shown), data lines DL, and a first driving voltage line VDDL, all electrically connected to the sub-pixels SP may be also disposed. The scan signal lines SCL and the sensing signal lines SSL may extend in the first direction (X-axis direction) in the display region DA. The data lines DL may extend in the second direction (Y-axis direction) crossing the first direction (X-axis direction) in the display region DA. The first driving voltage line VDDL may extend in the second direction (Y-axis direction) in the display region DA.

Each of the sub-pixels SP may be electrically connected to any one of the scan signal lines SCL, any one of the data lines DL, and any one of the sensing signal lines SSL. In FIG. 2, an example in which each of the sub-pixels SP is electrically connected to one scan signal line SCL, one data line DL, and one sensing signal line SSL is described, but the disclosure is not limited thereto. The sub-pixels SP may be commonly electrically connected to the first driving voltage line VDDL.

Figure 4:
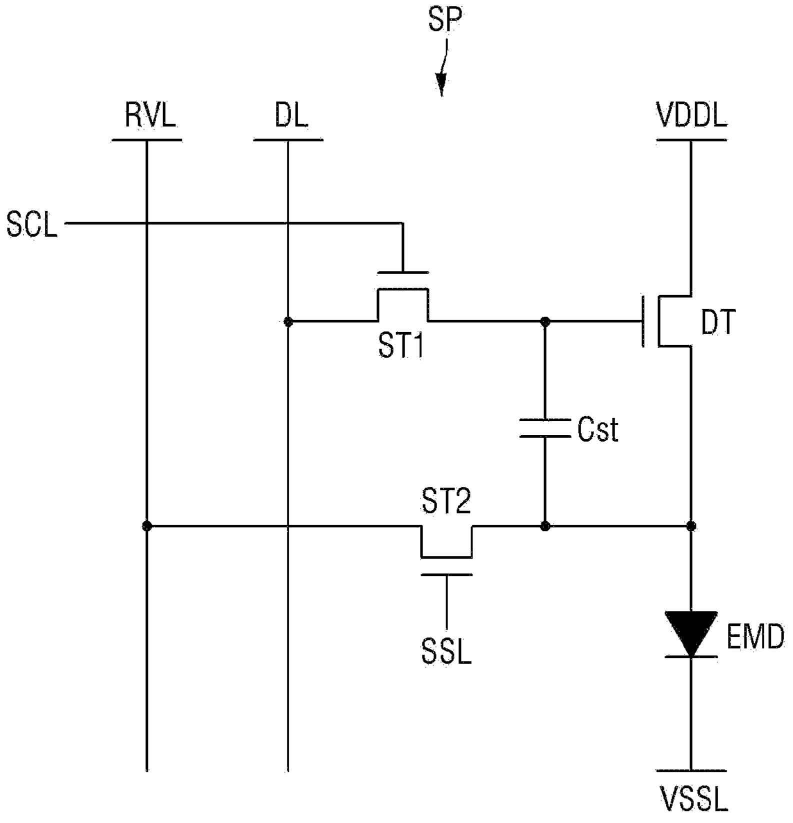
FIG. 4 is a schematic diagram of an equivalent of a sub-pixel according to one embodiment in detail.

As shown in FIG. 4, each of the sub-pixels SP may include a driving transistor DT, at least one switching transistor ST1, a light emitting element EMD, and a capacitor Cst. The transistor ST1 may be turned on in case that a scan signal is applied from the scan signal line SCL, and a data voltage of the data line DL may be applied to a gate electrode of a driving transistor DT. The driving transistor DT may make the light emitting element EMD emit light by supplying a driving current to the light emitting element EMD in response to the data voltage applied to the gate electrode. The driving transistor DT and at least one switching transistor ST1 may be thin film transistors. The light emitting element may emit light in response to the driving current of the driving transistor DT. The light emitting element may be an organic light emitting diode including a first electrode, an organic light emitting layer, and a second electrode. The capacitor Cst may serve to constantly maintain the data voltage applied to the gate electrode of the driving transistor DT.

The non-display region NDA may be defined as a region from the outside of the display region DA to the edge of the display panel 110. The scan signal driver 200 for applying scan signals to the scan signal lines SCL and applying sensing signals to the sensing signal lines SSL (not shown) may be disposed in the non-display region NDA.

The scan signal driver 200 may be electrically connected to a pixel driving circuit through multiple scan signal lines SCL. The scan signal driver 200 may receive a scan control signal SCS from the timing controller 170 through the multiple scan signal lines SCL. The scan control signal SCS may include multiple clock signals, a sensing control signal, a gate-on voltage, and a gate-off voltage. The scan signal driver 200 may generate the scan signals and the sensing signals in response to the scan control signal SCS, and output the scan signals and the sensing signals to the scan signal lines SCL and the sensing signal lines SSL (not shown). In FIG. 2, an example in which the scan signal driver 200 is formed at both sides of the display region DA, for example, in the non-display region NDA at left and right sides of the display region DA is described, but the disclosure is not limited thereto. For example, the scan signal driver 200 may be formed at one side of the display region DA, for example, in the non-display region NDA at the left or right side of the display region DA.

In each of the flexible films 122, a portion may be attached to a first surface of the first substrate 111 of the display panel 110, and another portion may be attached to a surface of the source circuit board 140. Specifically, since the second substrate 112 is smaller than the first substrate 111, a portion of the first substrate 111 may be exposed without being covered by the second substrate 112. The flexible films 122 may be attached to a side of the first substrate 111 that is exposed without being covered by the second substrate 112. Each of the flexible films 122 may be attached to the first surface of the first substrate 111 and the surface of the source circuit board 140 using an anisotropic conductive film.

Each of the flexible films 122 may be a flexible film such as a chip on film or a tape carrier package. The flexible films 122 may be bent to a lower portion of the first substrate 111, and the source circuit boards 140, the first cables 150, and the control circuit board 160 may be disposed on a lower surface of the display panel 110. In FIGS. 1 and 2, an example in which eight flexible films 122 are attached to the first substrate 111 of the display panel 110 is described, but in the specification, the number of flexible films 122 is not limited thereto.

The source drivers 121 of the data driver 120 may be respectively disposed on one surfaces of the flexible films 122. The source drivers 121 may be formed of an integrated circuit (IC). The data driver 120 may convert digital video data DATA to analog data voltages in response to a source control signal DCS of the timing controller 170 to supply the analog data voltages to the data lines of the display panel 110 through the flexible films 122.

Each of the source circuit boards 140 may be electrically connected to the control circuit board 160 through the first cables 150. Each of the source circuit boards 140 may include first connectors 151 to be electrically connected to the first cables 150. Each of the source circuit boards 140 may be a flexible printed circuit board or a printed circuit board. The first cables 150 may be flexible cables.

The control circuit board 160 may be electrically connected to the source circuit boards 140 through the first cables 150. To this end, the control circuit board 160 may include second connectors 152 to be electrically connected to the first cables 150. The control circuit board 160 may be a flexible printed circuit board or a printed circuit board.

In FIGS. 1 and 2, an example in which four first cables 150 connect the source circuit boards 140 and the control circuit board 160 is described, but in the specification, the number of first cables 150 is not limited thereto. Further, in FIGS. 1 and 2, although two source circuit boards 140 are shown, in the specification, the number of source circuit boards 140 is not limited thereto. In case that the number of flexible films 122 is small, the source circuit boards 140 may be omitted. The flexible films 122 may be directly connected to the control circuit board 160.

The data compensator 190 and the timing controller 170 may be disposed on one surface of the control circuit board 160. As shown in FIGS. 1 and 2, each of the data compensator 190 and the timing controller 170 may be formed as a separate integrated circuit, but the data compensator 190 and the timing controller 170 may be integral with each other.

The data compensator 190 may receive digital image data RGB from a system-on-chip of a system circuit board.

The data compensator 190 may analyze the image data RGB input from the system-on-chip to set at least one deterioration generation region (hereinafter, referred to as a deterioration region) and deterioration peripheral regions, and may compensate and modulate image data for the at least one deterioration region according to image data analysis results of the at least one deterioration region and the deterioration peripheral regions.

Specifically, the data compensator 190 may divide the digital image data RGB, which is sequentially input, into data in units of (or per) at least one frame. The at least one deterioration region where the sub-pixels SP are deteriorated in the display region DA of the display panel 110 may be set by analyzing the digital image data RGB of multiple frames which are sequentially input. The data compensator 190 may compensate and modulate the image data in the deterioration region with a first compensation gain value according to image data gradation values of the deterioration region and the number of frames (or period) in which deterioration is maintained, to generate compensation data M_Data in units of at least one frame.

Further, the data compensator 190 may also set at least one peripheral region according to the deterioration region. The data compensator 190 may extract a second compensation gain value according to a comparison result between image data gradation values of the deterioration region and image data gradation values of the peripheral region. The data compensator 190 may compensate and modulate the image data in the deterioration region with the second compensation gain value extracted in response to changes in the image data gradation values of the deterioration region and the image data gradation values of the peripheral region, to generate the compensation data M_Data in units of at least one frame. Accordingly, the data compensator 190 may extract the second compensation gain values to correspond to changes in the image data gradation values for the peripheral regions of the deterioration region in addition to the image data gradation values of the deterioration region. Further, the compensation data M_Data may be generated in units of at least one frame by calculating the second compensation gain values and the digital image data RGB. The deterioration compensation technology of the data compensator 190 will be described later in more detail with reference to the accompanying drawings.

The timing controller 170 may sequentially receive the compensation data M_Data from the data compensator 190. The timing controller 170 may receive timing signals from the system-on-chip of the system circuit board. The timing controller 170 may generate the source control signal DCS for controlling the timing of the source drivers 121 of the data driver 120 and the scan control signal SCS for controlling the timing of the scan signal driver 200 according to the timing signals. The timing controller 170 may output the scan control signal SCS to the scan signal driver 200, and may output the compensation data M_Data and the source control signal DCS to the data driver 120.

The power supply unit 180 may generate a first driving voltage and may supply the first driving voltage to the first driving voltage line VDDL. The power supply unit 180 may generate a second driving voltage and supply the second driving voltage to a cathode of the organic light emitting diode of each of the sub-pixels SP. The first driving voltage may be a higher potential voltage for driving the organic light emitting diode, and the second driving voltage may be a lower potential voltage for driving the organic light emitting diode. For example, the first driving voltage may have a higher potential than the second driving voltage. The power supply unit 180 may generate a reference voltage and supply the reference voltage to a reference voltage line (not shown) electrically connected to each of the sub-pixels SP.

FIG. 4 is a schematic diagram of an equivalent of a sub-pixel according to an embodiment in detail.

Referring to FIG. 4, the sub-pixel SP may include a light emitting element EMD, a driving transistor DT, a first switching transistor ST1, a second switching transistor ST2, and a capacitor Cst.

The light emitting element EMD may emit light in response to a current supplied through the driving transistor DT. The light emitting element EMD may be an organic light emitting diode, but is not limited thereto. For example, the light emitting element EMD may be a quantum dot light emitting diode, an inorganic light emitting diode, or a micro light emitting diode. In case that the light emitting element EMD is an organic light emitting diode, the light emitting element EMD may include an anode, a hole transporting layer, an organic light emitting layer, an electron transporting layer, and a cathode. In the light emitting element EMD, in case that a voltage is applied to the anode and the cathode, holes and electrons may move to the organic light emitting layer through the hole transporting layer and the electron transporting layer, respectively, and may be combined with each other in the organic light emitting layer to emit light. The anode of the light emitting element EMD may be electrically connected to a source electrode of the driving transistor DT, and the cathode may be electrically connected to a second driving voltage line VSSL to which a low potential voltage lower than a high potential voltage may be supplied.

The driving transistor DT may adjust a current flowing from the first power line VDDL where a first power voltage is supplied to the light emitting element EMD according to a voltage difference between a gate electrode and the source electrode. The gate electrode of the driving transistor DT may be electrically connected to a first electrode of the first switching transistor ST1, the source electrode may be electrically connected to the anode of the light emitting element EMD, and a drain electrode may be electrically connected to the first power supply line VDDL where the high potential voltage is applied.

The first switching transistor ST1 may be turned on by the scan signals of the scan signal line SCL to connect the data line DL to the gate electrode of the driving transistor DT. A gate electrode of the first switching transistor ST1 may be electrically connected to the scan signal line SCL, the first electrode may be electrically connected to the gate electrode of the driving transistor DT, and a second electrode may be electrically connected to the data line DL.

The second switching transistor ST2 is turned on by the sensing signals of the sensing signal line SSL to connect a reference voltage line RVL to the source electrode of the driving transistor DT. A gate electrode of the second switching transistor ST2 may be electrically connected to the sensing signal line SSL, a first electrode may be electrically connected to the reference voltage line RVL, and a second electrode may be electrically connected to the source electrode of the driving transistor DT.

In each of the first and second switching transistors ST1 and ST2, one of the first and second electrodes may be a source electrode, and the other one may be a drain electrode.

The capacitor Cst may be formed between the gate electrode and the source electrode of the driving transistor DT. The capacitor Cst may store a voltage difference between the gate voltage and the source voltage of the driving transistor DT.

The driving transistor DT and the first and second switching transistors ST1 and ST2 may be formed as thin film transistors. In FIG. 3, the embodiment shows that each of the driving transistor DT and the first and second switching transistors ST1 and ST2 is formed as an N-type metal oxide semiconductor field effect transistor (MOSFET), but the disclosure is not limited thereto. Each of the driving transistor DT and the first and second switching transistors ST1 and ST2 may be formed as a P-type MOSFET.

Figure 5:
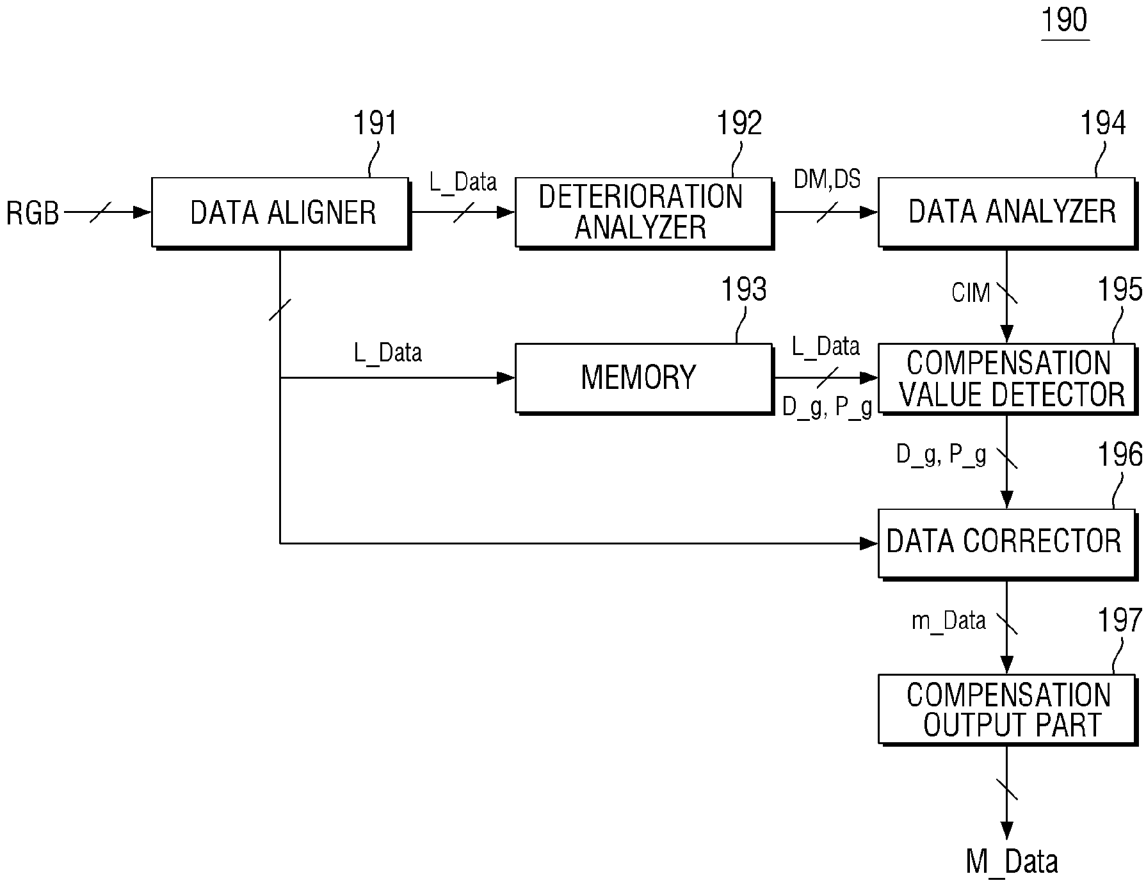
FIG. 5 is a schematic block diagram illustrating a configuration of a data compensator in FIG. 3 according to an embodiment in detail.

FIG. 5 is a schematic block diagram illustrating a configuration of the data compensator in FIG. 3 according to an embodiment in detail.

Referring to FIG. 5, the data compensator 190 may include a data aligner 191, a deterioration analyzer 192, a memory 193, a data analyzer 194, a compensation value detector 195, a data corrector 196, and a compensation output part 197.

Specifically, the data aligner 191 may divide and align the digital image data (RGB, hereinafter, also referred to as image data) sequentially input from the system-on-chip of the system circuit board in units of each sub-pixel SP, at least one horizontal line (or scan line), and at least one frame. Each piece of aligned image data L_Data may be sequentially stored in the memory 193. The data aligner 191 may sequentially supply the image data L_Data aligned in units of each sub-pixel SP, at least one horizontal line (or scan line), and at least one frame to the deterioration analyzer 192.

The deterioration analyzer 192 may sequentially compare and analyze the image data RGB of multiple frames which are sequentially input in case that the image data L_Data aligned in units of each sub-pixel SP, at least one horizontal line (or scan line), and at least one frame is input. At least one deterioration region where the sub-pixels SP are deteriorated, and the deterioration peripheral regions may be classified and set according to the comparison results.

The deterioration analyzer 192 may share setting information DM of the at least one deterioration region and setting information DS of the deterioration peripheral regions with the data analyzer 194. The setting information DM of the deterioration region and the setting information DS of the deterioration peripheral regions may be x and y coordinate information according to positions of the sub-pixels SP included in each of the deterioration region and the deterioration peripheral regions.

The data analyzer 194 may receive the setting information DM of the deterioration region and the setting information DS of the deterioration peripheral regions, and may sequentially compare gradation values of the image data for each sub-pixel included in the deterioration region to divide and separate the deterioration region into multiple block regions. The data analyzer 194 may sequentially compare the gradation values of the image data for each sub-pixel included in the deterioration peripheral regions to divide and separate the deterioration peripheral regions into multiple block regions. Average gradation values for the divided block regions in the at least one deterioration region and the deterioration peripheral regions may be calculated.

The compensation value detector 195 may extract a first or second compensation gain value by analyzing the average gradation values for each block region included in the at least one deterioration region and the average gradation values for each block region included in the deterioration peripheral regions.

Specifically, the compensation value detector 195 may detect the number of frames in which the average gradation values for each block region included in the at least one deterioration region are the same or maintained within a preset gradation range. The compensation value detector 195 may detect a period in which the average gradation values for each block region included in the at least one deterioration region are the same or maintained within the preset gradation range. The compensation value detector 195 may extract a first compensation gain value D_g according to the period or the number of frames in which the average gradation values for each block region included in the deterioration region are the same or maintained within the preset gradation range. The extracted first compensation gain value D_g may be transmitted to the data corrector 196.

Like the deterioration region, the compensation value detector 195 may detect the number of frames in which the average gradation values for each block region included in the deterioration peripheral regions are the same or maintained within a preset gradation range. The compensation value detector 195 may also detect a period in which the average gradation values for each block region included in the deterioration peripheral regions are the same or maintained within the preset gradation range.

The compensation value detector 195 may determine that deterioration occurred in the deterioration peripheral regions in case that the number of frames in which the average gradation values for each block region included in the deterioration peripheral regions are the same or maintained within the preset gradation range becomes greater than or equal to a preset reference number of frames. In case that the maintained period becomes greater than or equal to a preset period, it may be determined that the deterioration occurred in the deterioration peripheral regions.

The compensation value detector 195 may compare the average gradation values for each block region included in the deterioration region and the average gradation value for any one block region included in the deterioration peripheral regions to extract a second compensation gain value P_g according to the comparison result. When the second compensation gain value P_g is extracted, the compensation value detector 195 may stop extracting and outputting the first compensation gain value D_g and may transmit the second compensation gain value P_g to the data corrector 196.

When the first compensation gain value D_g is input from the compensation value detector 195, the data corrector 196 may calculate (for example, multiplies or adds) gradation values of the sub-pixels SP for each block region included in the deterioration region and the first compensation gain value D_g to compensate and modulate gradation data of the sub-pixels SP for each block region included in the deterioration region.

When the second compensation gain value P_g is input from the compensation value detector 195, the data corrector 196 may calculate the gradation values of the sub-pixels SP for each block region included in the deterioration region and the second compensation gain value P_g to compensate and modulate gradation data of the sub-pixels SP for each block region included in the deterioration region.

The compensation output part 197 may combine the image data L_Data aligned for each frame and image data m_Data of the deterioration region in which the gradation values are compensated and modulated by the data corrector 196 according to the x, y coordinate position for the sub-pixel SP to generate the compensation data M_Data in units of at least one frame.

The memory 193 may store the image data L_Data aligned in units of each sub-pixel SP, at least one horizontal line (or scan line), and at least one frame through the data aligner 191. Like the above, the image data L_Data aligned in units of each sub-pixel SP, at least one horizontal line (or scan line), and at least one frame may be shared with the data analyzer 194, the data corrector 196, the compensation output part 197, and the like.

The first compensation gain values D_g preset by (or preset based on) an experimental value may be stored in the memory 193 to correspond to the preset period or the preset number of frames for the average gradation values for each block region. The memory 193 may share the first compensation gain values D_g preset by the experimental value with the compensation value detector 195. The second compensation gain values P_g preset by an experimental value may be stored in the memory 193 to correspond to the average gradation values for each block region of the deterioration peripheral regions for the average gradation values for each block region of the deterioration region. The memory 193 may share the preset second compensation gain value P_g with the compensation value detector 195.

Figure 6:
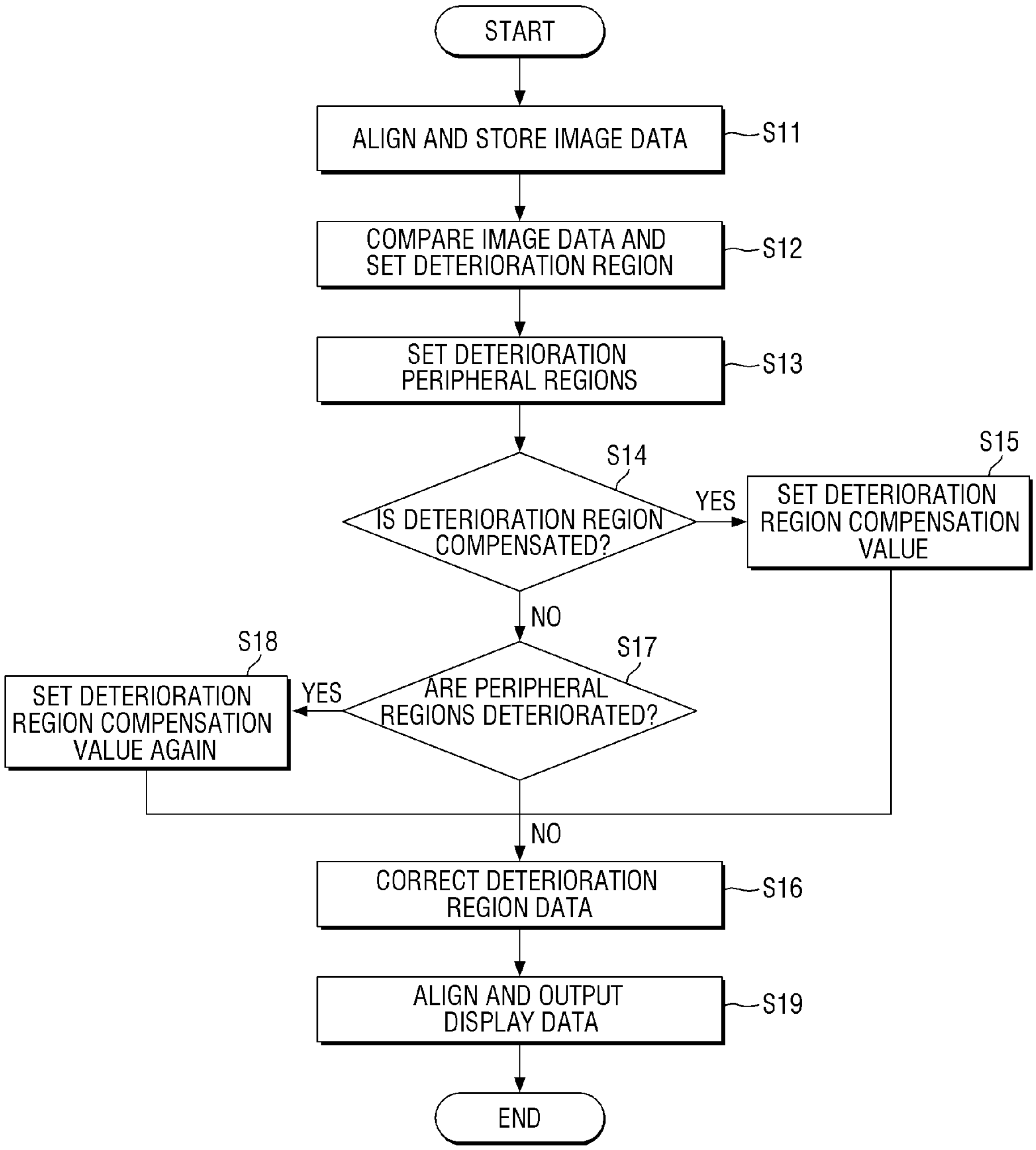
FIG. 6 is a flow chart for describing a data compensation method of the data compensator according to an embodiment of the disclosure.

FIG. 6 is a flow chart for describing a data compensation method of the data compensator according to an embodiment of the disclosure.

Referring to FIG. 6, first, the data aligner 191 may divide the image data RGB sequentially input through the system circuit board in units of each sub-pixel SP, at least one horizontal line (or scan line), and at least one frame. Each piece of divided and aligned image data (L_Data) may be stored in the memory 193 and may be sequentially supplied to the deterioration analyzer 192 (Operation S11).

Figure 7:
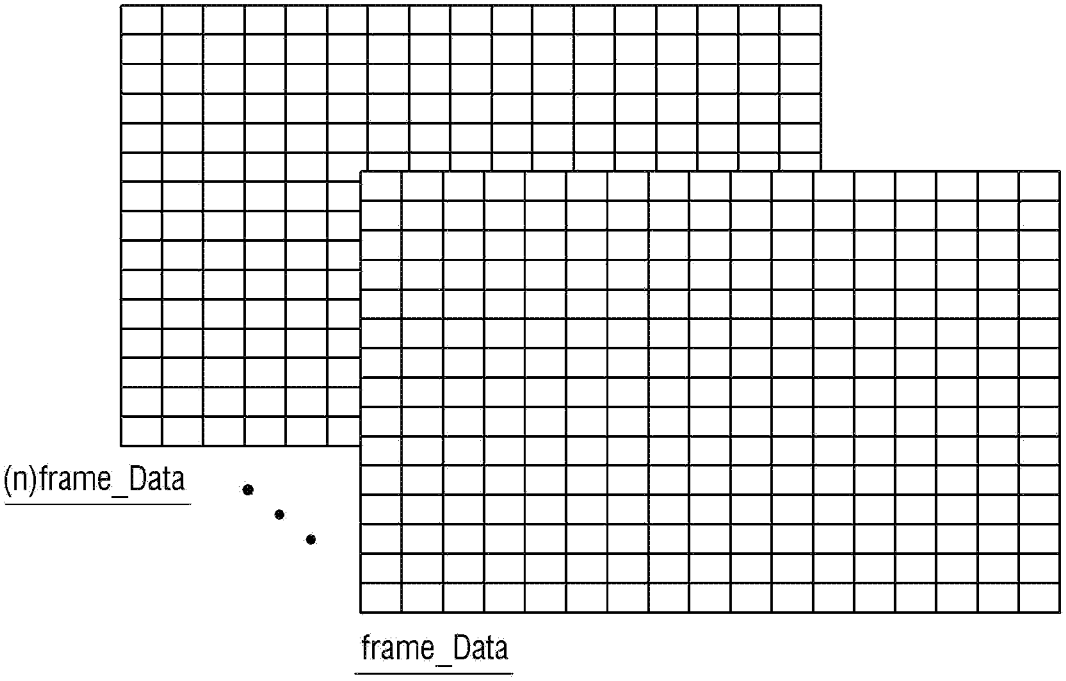
FIG. 7 is a schematic view for describing a method of comparing digital image data of a deterioration analyzer shown in FIG. 5 and setting a deterioration region.

FIG. 7 is a schematic view for describing a method of comparing digital image data of the deterioration analyzer shown in FIG. 5 and setting the deterioration region.

Referring to FIG. 7, the deterioration analyzer 192 may sequentially compare and analyze the image data RGB of the multiple frames in case that the image data L_Data aligned in units of each sub-pixel SP, at least one horizontal line (or scan line), and at least one frame is input. Specifically, the deterioration analyzer 192 may sequentially compare and analyze the image data RGB of the multiple frames with a method of sequentially comparing sub-pixel data of image data (n−1 RGB) of a previous frame, image data (n RGB) of a present frame, and image data (n+1 RGB) of a next frame.

In case that each piece of sub-pixel data included in the image data RGB of the multiple frames is identically maintained for a preset frame number or more or maintained at a gradation in a preset similarity range, the deterioration analyzer 192 may designate the sub-pixels as deteriorated pixels. Each of the regions where the deteriorated pixels may be disposed is set as the deterioration region (Operation S12).

In case that the deterioration regions where the deteriorated pixels are disposed are set, the deterioration analyzer 192 may apply a preset size of the sub-pixel matrix based on position of the set deterioration regions to set the deterioration peripheral regions. The deterioration analyzer 192 may share the setting information DM of the at least one deterioration region and the setting information DS of the deterioration peripheral regions with the data analyzer 194 (Operation S13).

Figure 8:
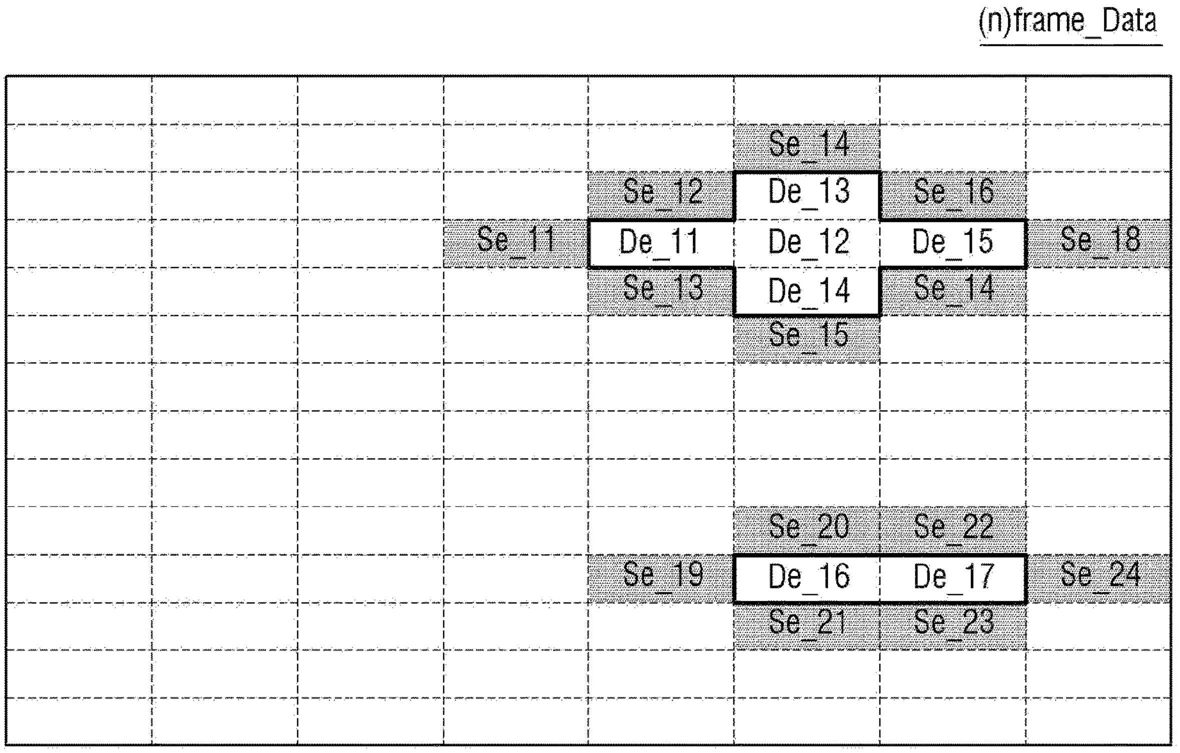
FIG. 8 is a schematic view for describing a method of setting the deterioration region and deterioration peripheral regions of the deterioration analyzer shown in FIG. 5.

FIG. 8 is a schematic view for describing a method of setting the deterioration region and the deterioration peripheral regions of the deterioration analyzer shown in FIG. 5.

Referring to FIG. 8, the data analyzer 194 may receive the setting information DM of the deterioration region and the setting information DS of the deterioration peripheral regions, and may sequentially compare the gradation values of the image data for each sub-pixel included in the deterioration region to divide the deterioration region into multiple block regions De_11 to De_17. The data analyzer 194 may compare the gradation values of pixels adjacent to each of the sub-pixels included in the deterioration region. The block regions may be set as the same block to divide the multiple block regions De_11 to De_17 according to a region where the sub-pixels having similar gradation values are disposed in case that the compared gradation difference value is within a preset range.

The data analyzer 194 may also sequentially compare (for example, compares the gradation values between adjacent sub-pixels) the gradation values of image data for each sub-pixel included in the deterioration peripheral regions to divide the deterioration peripheral regions into multiple block regions Se_11 to Se_24. The data analyzer 194 may calculate the average gradation values for the divided block regions in the at least one deterioration region and the deterioration peripheral regions.

Figure 10:
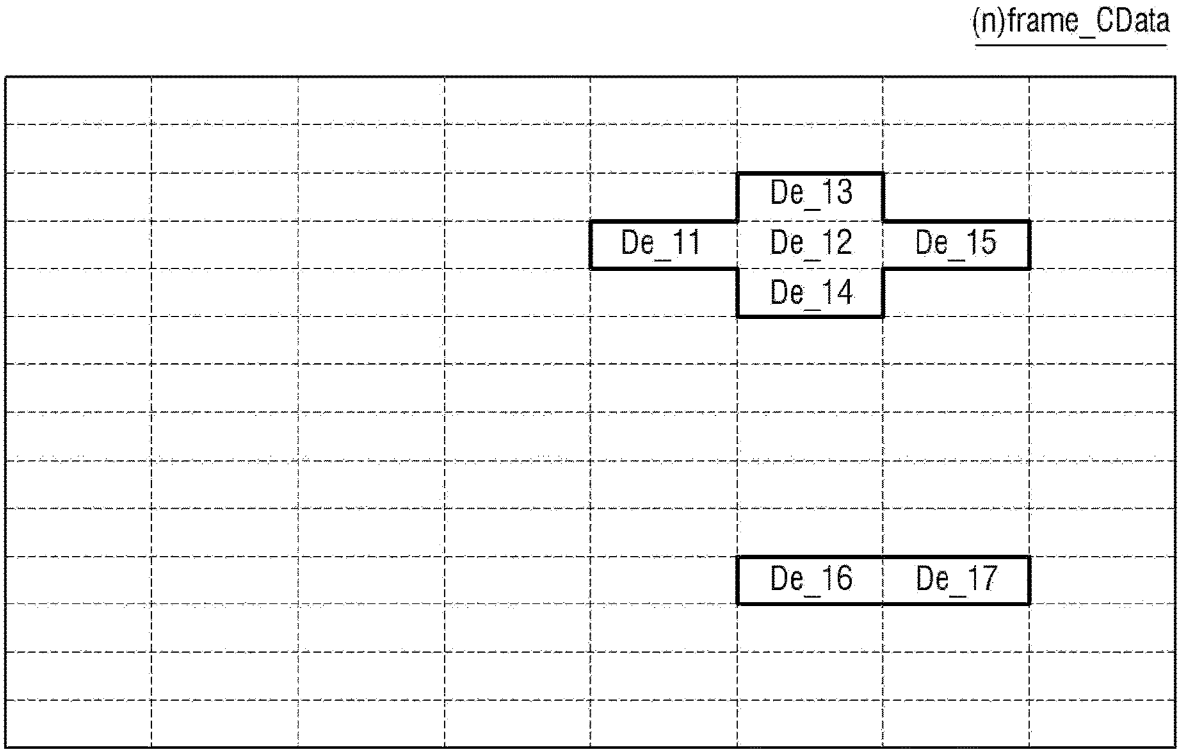
FIG. 10 is a schematic view for describing a method of compensating data for a deterioration region of the data compensator shown in FIG. 5.

FIG. 9 is a schematic view for describing a method of extracting the first compensation gain value for the deterioration region of the compensation value detector shown in FIG. 5. FIG. 10 is a schematic view for describing a method of compensating the data for the deterioration region of the data compensator shown in FIG. 5.

Referring to FIGS. 9 and 10, in case that the deterioration region is compensated, the compensation value detector 195 may calculate the average gradation values for each block region De_11 to De_17 included in the at least one deterioration region. The compensation value detector 195 may detect a period or the number of frames in which the average gradation values for each block region De_11 to De_17 are identically maintained or are maintained within a preset gradation range (Operation S14).

As described above, the first compensation gain values D_g preset by the experimental value may be stored in the memory 193 to correspond to the preset period or the preset number of frames for the average gradation values for each block region De_11 to De_17 of the deterioration region. Based on this, the compensation value detector 195 may extract the first compensation gain value D_g according to the period or the number of frames in which the average gradation values for each block region De_11 to De_17 included in the deterioration region are identically maintained or are maintained within the preset gradation range. The extracted first compensation gain value D_g may be transmitted to the data corrector 196 (Operation S15).

In case that the first compensation gain value D_g is input from the compensation value detector 195, the data corrector 196 may calculate the gradation values of the sub-pixels SP for each block region included in the deterioration region and the first compensation gain value D_g to compensate and modulate gradation data of the sub-pixels SP for each block region included in the deterioration region (Operation S16).

Figure 11:
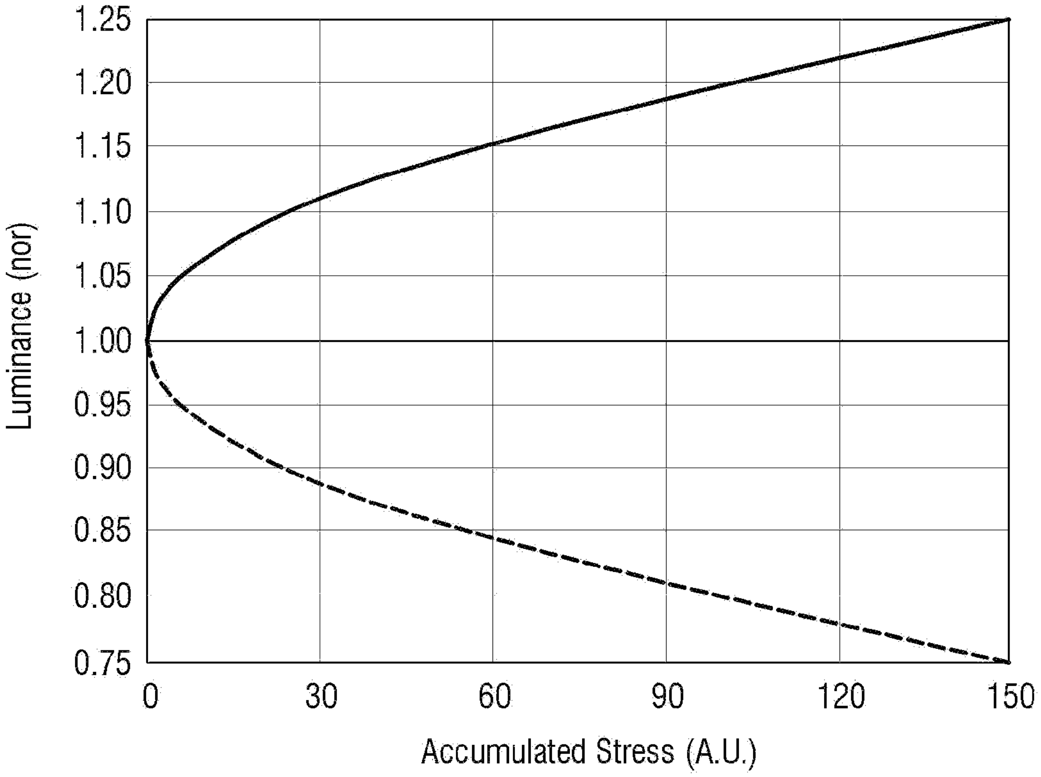
FIG. 11 is a graph for describing a method of compensating for deterioration of the data compensator shown in FIG. 5.
Figure 13:
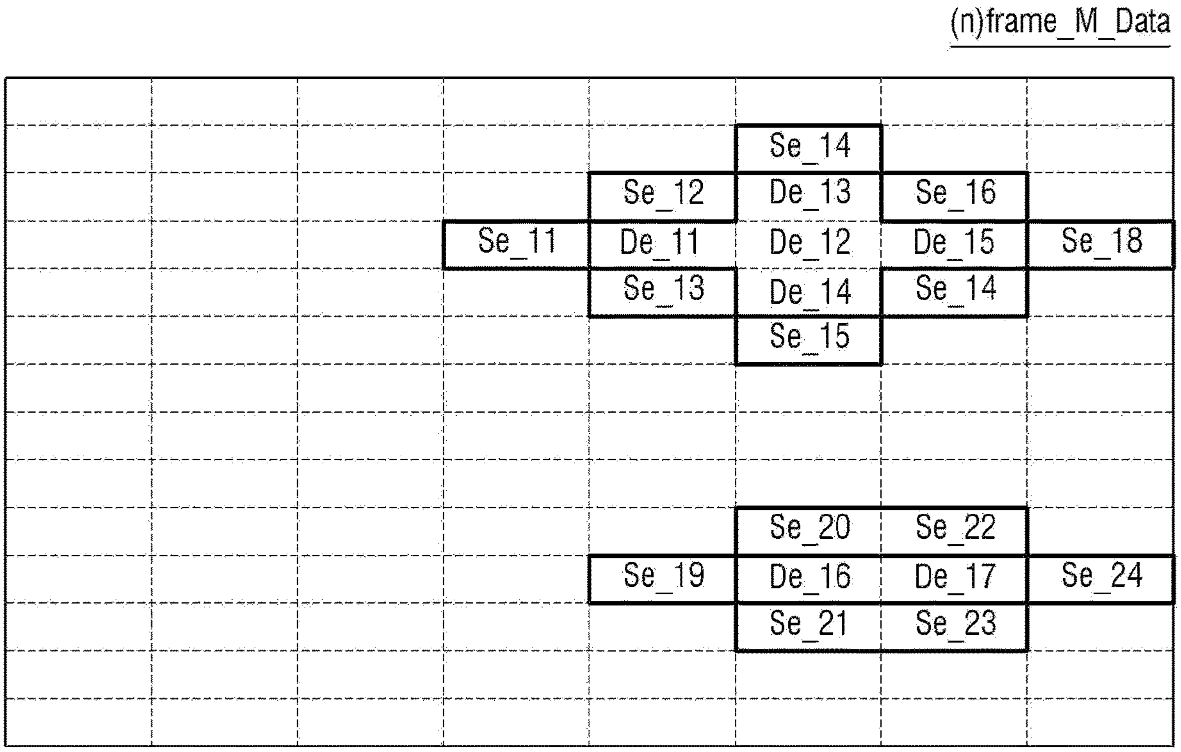
FIG. 13 is a schematic view for describing a method of compensating data for the deterioration region and deterioration peripheral regions of the data compensator shown in FIG. 5.

FIG. 11 is a graph for describing a method of compensating for deterioration of the data compensator shown in FIG. 5, and FIG. 12 is a schematic view for describing a method of extracting the second compensation gain value for the deterioration region of the compensation value detector shown in FIG. 5. FIG. 13 is a schematic view for describing a method of compensating data for the deterioration region and the deterioration peripheral regions of the data compensator shown in FIG. 5.

In order to check whether deterioration in the deterioration peripheral regions occurred, the compensation value detector 195 may detect the period or the number of frames in which average gradation values for each block region Se_11 to Se_24 included in the deterioration peripheral regions are the same or maintained within a preset gradation range.

In order to check whether deterioration in the deterioration peripheral regions occurred, the compensation value detector 195 may determine that the deterioration occurred in the deterioration peripheral regions in case that the period or the number of frames in which the average gradation values for each block region Se_11 to Se_24 included in the deterioration peripheral region are the same or maintained within a preset gradation range becomes greater than or equal to a preset reference period or a preset reference number of frames (Operation S17).

In case that it is determined that the deterioration occurred in the deterioration peripheral regions, the deterioration region may be compensated for in response to a gradation change of the deterioration peripheral regions. For this, the compensation value detector 195 may compare the average gradation value for each block region De_11 to De_17 included in the deterioration region and the average gradation value for any one of the block regions Se_11 to Se_24 included in the deterioration peripheral regions to extract the second compensation gain value P_g according to the comparison result.

As described above, the second compensation gain values P_g preset by an experimental value may be stored in the memory 193 to correspond to the average gradation value for each block region Se_11 to Se_24 of the deterioration peripheral regions for the average gradation value for each block region De_11 to De_17 of the deterioration region. Based on this, the compensation value detector 195 may compare the average gradation value for each block region De_11 to De_17 included in the deterioration region and the average gradation value for any one of the block regions Se_11 to Se_24 included in the deterioration peripheral regions to extract the second compensation gain value P_g according to the comparison result (Operation S18).

When the second compensation gain value P_g is extracted, the compensation value detector 195 may stop outputting the first compensation gain value D_g and may transmit the second compensation gain value P_g to the data corrector 196.

When the second compensation gain value P_g is input from the compensation value detector 195, the data corrector 196 may calculate the gradation values of the sub-pixels SP for each block region included in the deterioration region and the second compensation gain value P_g to compensate and modulate gradation data of the sub-pixels SP for each block region included in the deterioration region (Operation S19).

The compensation output part 197 may combine the image data L_Data divided for each frame and the image data m_Data of the deterioration region in which the gradation values are compensated and modulated by the data corrector 196 to generate the compensation data M_Data in units of at least one frame. The compensation data M_Data generated in units of at least one frame may be transmitted to the timing controller 170 to be displayed as an image.

A flat panel image display device used as the display device in the disclosure may be classified into an organic light emitting display device (OLED), an inorganic light emitting display device (inorganic EL), a quantum dot light emitting display device (QED), a micro-LED display device (micro-LED), a nano-LED display device (nano-LED), a plasma display device (PDP), a field emission display device (FED), a cathode ray display device (CRT), a liquid crystal display device (LCD), an electrophoretic display device (EPD), and the like according to a display method.

Figure 14:
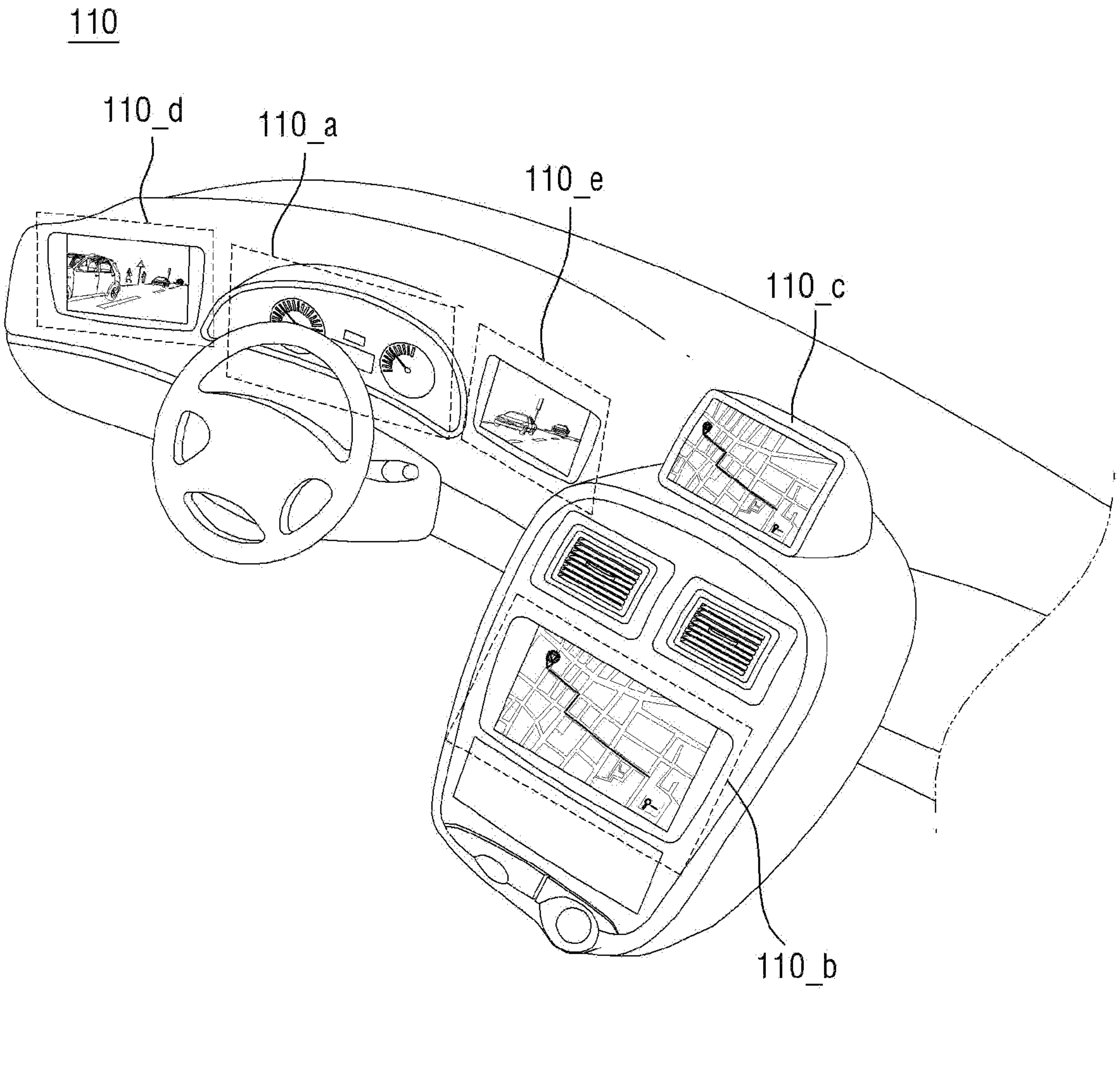
FIG. 14 is a perspective view illustrating a vehicle instrument panel and a center fascia each including a display module according to an embodiment.

FIG. 14 is a perspective view illustrating a vehicle instrument panel and a center fascia each including a display module according to an embodiment.

Referring to FIG. 14, the display panel 110 included in the display device of the disclosure may be applied to an instrument panel 110_*a* of a vehicle, a center fascia 110_*b* of the vehicle, or center information displays (CID) 110_*d* and 110_*e* disposed on a dashboard of the vehicle. The display panel 110 according to an embodiment may be applied to rear view mirror displays 110_*d* and 110_*e* which replace wing mirrors of the vehicle, a navigation device, or the like.

Figure 15:
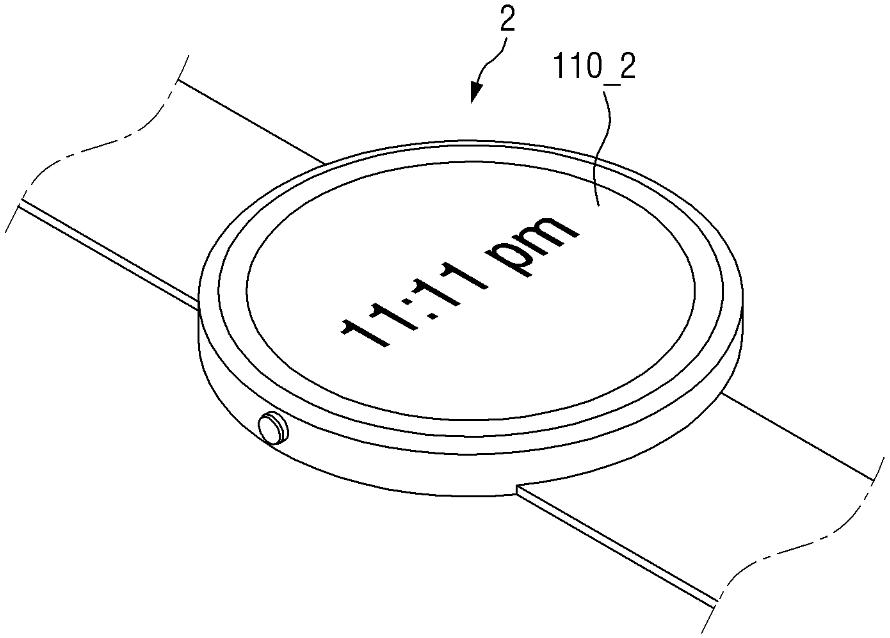
FIG. 15 is a perspective view illustrating a watch-type smart device including a display module according to an embodiment.
Figure 16:
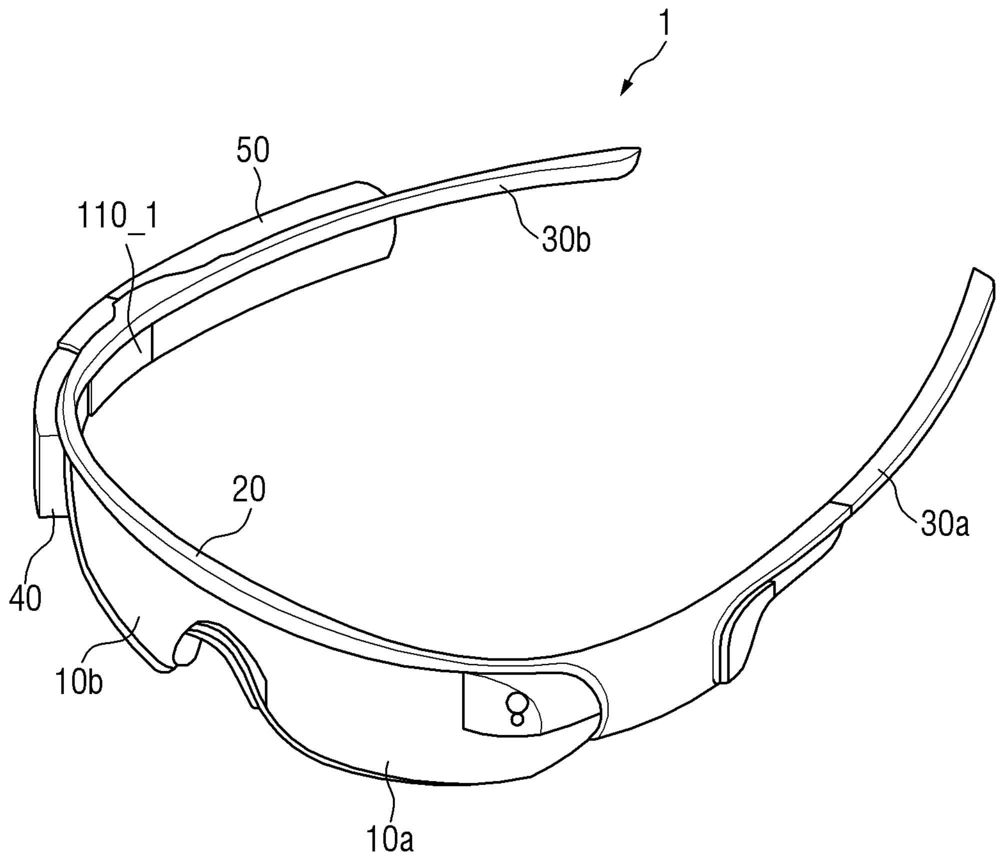
FIG. 16 is a perspective view illustrating a glasses-type virtual reality device including a display module according to an embodiment.

FIG. 15 is a perspective view illustrating a watch-type smart device including a display module according to an embodiment. FIG. 16 is a perspective view illustrating a glasses-type virtual reality device including a display module according to an embodiment.

As shown in FIG. 15, the display panel 110 included in the display device of the disclosure may be applied to a watch-type smart device 2 which is one of the smart devices. The display device according to an embodiment may be a glasses-type device. The glasses-type display device according to an embodiment may include a display panel 110_1, a left eye lens 10*a*, a right eye lens 10*b*, a support frame 20, glasses frame legs 30*a* and 30*b*, a reflective member 40, and a display device accommodation part 50.

FIG. 16 is a perspective view illustrating a glasses-type virtual reality device including a display module according to an embodiment. FIG. 16 illustrates a glasses-type display device including glasses frame legs 30*a* and 30*b*, but a glasses-type display device 1 according to an embodiment may also be applied to a head mounted display including a head mounted band which may be mounted on a head instead of the glasses frame legs 30*a* and 30*b*. For example, the glasses-type display device according to an embodiment is not limited to the embodiment illustrated in FIG. 16, and may be applied to various other electronic devices in various other forms.

The display device accommodation part 50 may include a display device such as a micro-LED display device or the like and the reflective member 40. An image displayed on the display device may be reflected by the reflective member 40 and provided to a user's right eye through the right eye lens 10*b*. Accordingly, the user may view a virtual reality image displayed on the display device 10 through the right eye.

In FIG. 16, although an example in which the display device accommodation part 50 is disposed at a right end of the support frame 20 is described, the embodiment of the specification is not limited thereto. For example, the display device accommodation part 50 may be disposed at a left end of the support frame 20. The image displayed on the display device may be reflected by the reflective member 40 and provided to a user's left eye through the left eye lens 10*a*. Accordingly, the user may view the virtual reality image displayed on the display device through the left eye. In other embodiments, the display device accommodation part 50 may be disposed at both the left and right ends of the support frame 20, and the user may view the virtual reality image displayed on the display device through both the left and right eyes.

Figure 17:
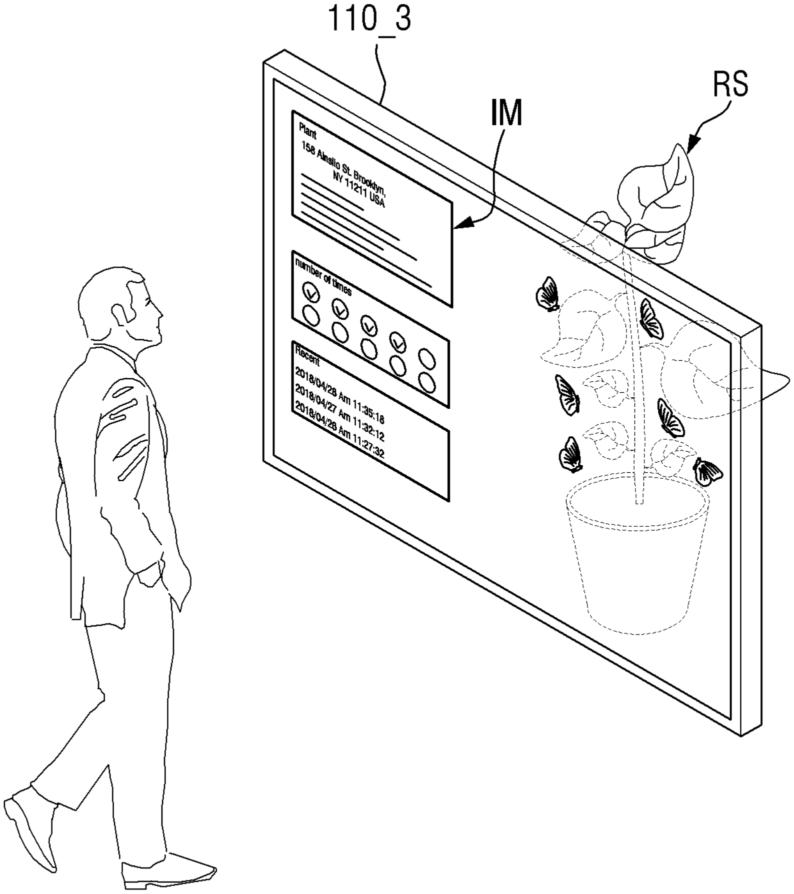
FIG. 17 is a perspective view illustrating a transparent display device including a display module according to an embodiment.

FIG. 17 is a perspective view illustrating a transparent display device including a display module according to an embodiment.

Referring to FIG. 17, the display panel 110 included in the display device of the disclosure may be applied to a transparent display device. The transparent display device may transmit light while displaying an image IM. Accordingly, a user located in front of the transparent display device may view the image IM displayed on the display panel 110, and additionally view an object RS or a background located on a rear side of the transparent display device. In case that the image display panel 110 is applied to the transparent display device, the display panel 110 of the display device shown in FIGS. 1 and 2 may include a light transmitting portion capable of transmitting light or may be formed of a material capable of transmitting light.

In concluding the detailed description, those skilled in the art will appreciate that many variations and modifications can be made to the embodiments without substantially departing from the principles of the disclosure. Therefore, the disclosed embodiments of the disclosure are used in a generic and descriptive sense only and not for purposes of limitation.

What is claimed is:

1. A display device comprising:

a display panel including sub-pixels arranged in an image display region of the display panel to display an image;

a data driver that applies a data voltage to data lines;

a scan signal driver that applies scan signals to scan signal lines;

a data compensator that analyzes image data received from an outside to divide at least one deterioration region and deterioration peripheral regions, and compares and analyzes the image data of the at least one deterioration region and the deterioration peripheral regions to compensate or modulate the image data of the at least one deterioration region, the data compensator including a deterioration analyzer that sequentially compares and analyzes the image data per at least one frame to set the at least one deterioration region and the deterioration peripheral regions, wherein the deterioration analyzer designates at least one sub-pixel of at least one deterioration region as deteriorated based on image data of frames wherein the deterioration analyzer sequentially compares and analyzes the image data of frames by sequentially comparing sub-pixel data of a sub-pixel included in the image data of adjacent ones of the frames, designates the sub-pixel as a deteriorated pixel in case that the sub-pixel data of the sub-pixel included in the image data of the frames is identically maintained for a preset number of frames or more or maintained at a gradation in a preset similarity range, and sets a region where the deteriorated pixel is disposed as one of the at least one deterioration region; and a timing controller that controls the data driver and the scan signal driver to display compensation data including the compensated or modulated image data as an image.

2. The display device of claim 1, wherein the data compensator further comprises:

a data analyzer that calculates average gradation values of the at least one deterioration region and the deterioration peripheral regions;

a compensation value detector that analyzes at least one of the average gradation values of the at least one deterioration region and the average gradation values of the deterioration peripheral regions to extract a first compensation gain value or a second compensation gain value; and a data corrector that compensates or modulates gradation values of the sub-pixels of the at least one deterioration region using the first compensation gain value or the second compensation gain value.

3. The display device of claim 2, wherein the data compensator further comprises:

a data aligner that divides and aligns the image data sequentially input from the outside or a system-on-chip of a system circuit board per the sub-pixels, per at least one scan line, and per at least one frame to sequentially store the image data in a memory; and a compensation output part that combines the image data and the compensated or modulated image data to generate the compensation data per at least one frame.

4. The display device of claim 2, wherein the deterioration analyzer applies a preset size of a sub-pixel matrix based on position coordinates of the at least one deterioration region to set the deterioration peripheral regions, and shares setting information of the at least one deterioration region and setting information of the deterioration peripheral regions with the data analyzer.

5. The display device of claim 2, wherein the data analyzer sequentially compares gradation values of image data of the sub-pixels included in the deterioration region to divide the deterioration region into block regions, and sets the block regions as a same block in case that a difference in the gradation values between sequentially compared sub-pixels adjacent to each other is within a preset range to divide the block regions for the deterioration region according to a region where sub-pixels having similar gradation values are disposed.

6. The display device of claim 5, wherein the data analyzer sequentially compares gradation values of image data of the sub-pixels included in the deterioration peripheral regions to divide the deterioration peripheral regions into block regions, and calculates average gradation values of the divided block regions in the at least one deterioration region and the deterioration peripheral regions.

7. The display device of claim 5, wherein the compensation value detector calculates average gradation values of the block regions included in the at least one deterioration region, detects a period or number of frames in which the average gradation values of the block regions are identically maintained or are maintained within a preset gradation range, and extracts a first compensation gain value according to the period or the number of frames in which the average gradation values of the block regions are identically maintained or maintained within the preset gradation range.

8. The display device of claim 7, wherein the data compensator multiplies or adds the gradation values of the sub-pixels for the block regions included in the at least one deterioration region and the first compensation gain value to compensate or modulate gradation data of the sub-pixels for the block regions included in the at least one deterioration region in case that the first compensation gain value is input into the data compensator.

9. The display device of claim 5, wherein the compensation value detector detects a period or number of frames in which average gradation values of block regions included in the deterioration peripheral regions are identically maintained or are maintained within a preset gradation range, and determines that deterioration occurred in a corresponding one of the deterioration peripheral regions in case that the period or the number of frames in which the average gradation values of the block regions included in the corresponding one of the deterioration peripheral regions are identically maintained or are maintained within a preset gradation range becomes greater than or equal to a preset period or a preset number of frames.

10. The display device of claim 9, wherein the compensation value detector compares the average gradation values of the block regions included in the at least one deterioration region and an average gradation value of any one of the block regions included in the deterioration peripheral regions to extract a second compensation gain value according to a comparison result in case that it is determined that the deterioration occurred in the corresponding one of the deterioration peripheral regions.

11. The display device of claim 10, wherein the data compensator adds or multiplies the gradation values of the sub-pixels for the block regions included in the at least one deterioration region and the second compensation gain value to compensate or modulate gradation data of the sub-pixels for the block regions included in the at least one deterioration region in case that the second compensation gain value is input into the data compensator.

12. A method of driving a display device, comprising:

aligning image data received from an outside per at least one frame;

sequentially comparing and analyzing the image data per at least one frame and setting at least one deterioration region and deterioration peripheral regions, wherein setting the at least one deterioration region includes designating at least one sub-pixel of at least one deterioration region as deteriorated based on image data of frames;

calculating average gradation values of the at least one deterioration region and the deterioration peripheral regions;

analyzing the average gradation values of the at least one deterioration region and the deterioration peripheral regions and extracting a first compensation gain value or a second compensation gain value, wherein the setting of the at least one deterioration region and the deterioration peripheral regions comprises sequentially comparing and analyzing the image data of frames by sequentially comparing sub-pixel data of a sub-pixel included in the image data of adjacent ones of the frames, designating the sub-pixel as a deteriorated pixel in case that the sub-pixel data of the sub-pixel included in the image data of the frames is identically maintained for a preset number of frames or more or maintained at a gradation in a preset similarity range, setting a region where the deteriorated pixel is disposed as one of the at least one deterioration region; and applying a preset size of a sub-pixel matrix based on position coordinates of the at least one deterioration region to set the deterioration peripheral regions; and compensating or modulating gradation values of sub-pixels of the at least one deterioration region using the first compensation gain value or the second compensation gain value.

13. The method of claim 12, further comprising:

combining the image data and the compensated or modulated image data to generate compensation data per at least one frame; and controlling a data driver and a scan signal driver to display the compensation data as an image on a display panel.

14. The method of claim 13, wherein the calculating of the average gradation values of the at least one deterioration region and the deterioration peripheral regions comprises:

sequentially comparing the gradation values of image data for sub-pixels included in the deterioration region and dividing the deterioration region into block regions; and setting the block regions as a same block in case that a difference in the gradation values between the sequentially compared sub-pixels adjacent each other is within a preset range to divide the block regions for the deterioration region according to a region where the sub-pixels having similar gradation values are disposed.

15. The method of claim 14, wherein the calculating of the average gradation values of the at least one deterioration region and the deterioration peripheral regions further comprises:

sequentially comparing the gradation values of image data for sub-pixels included in each of the deterioration peripheral regions and dividing the deterioration peripheral regions into block regions; and calculating average gradation values of the divided block regions in the at least one deterioration region and the deterioration peripheral regions.

16. The method of claim 15, wherein the extracting of the first compensation gain value or second compensation gain value comprises:

calculating the average gradation values of the block regions included in the at least one deterioration region;

detecting a period or number of frames in which the average gradation values of the block regions are identically maintained or are maintained within a preset gradation range; and extracting a first compensation gain value according to the period or the number of frames in which the average gradation values of the block regions are identically maintained or are maintained within the preset gradation range.

17. The method of claim 15, wherein the extracting of the first compensation gain value and the second compensation gain value comprises:

detecting a period or number of frames in which the average gradation values of the block regions included in the deterioration peripheral regions are identically maintained or are maintained within a preset gradation range; and determining that deterioration occurred in a corresponding one of the deterioration peripheral regions in case that the period or number of frames in which the average gradation values of the block regions included in the corresponding one of the deterioration peripheral regions are identically maintained or are maintained within a preset gradation range becomes greater than or equal to a preset period or a preset number of frames.

18. The method of claim 17, wherein the extracting of the first compensation gain value or the second compensation gain value further comprises comparing the average gradation values of the block regions included in the deterioration region and an average gradation value of any one of the block regions included in the deterioration peripheral regions and extracting a second compensation gain value according to a comparison result in case that it is determined that the deterioration occurred in the corresponding one of the deterioration peripheral regions.

* * * * *